US012592902B2

(12) United States Patent
Bhattacharya et al.

(10) Patent No.: US 12,592,902 B2

(45) Date of Patent: Mar. 31, 2026

(54) CONTEXT-BASED SENSITIVE MESSAGE DETECTION

(71) Applicant: Palo Alto Networks, Inc., Santa Clara, CA (US)

(72) Inventors: Avishek Bhattacharya, Bangalore (IN); Yaser Karbaschi, San Jose, CA (US); Pralay Ramteke, Chandrapur (IN); Anirudh Mittal, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/392,345

(22) Filed: Dec. 21, 2023

(65) Prior Publication Data

US 2025/0211555 A1    Jun. 26, 2025

(51) Int. Cl.
*H04L 51/212* (2022.01)
*G06F 40/35* (2020.01)

(52) U.S. Cl.
CPC ............ *H04L 51/212* (2022.05); *G06F 40/35* (2020.01)

(58) Field of Classification Search
CPC ............................... H04L 51/212; G06F 40/35
USPC ........................................................ 709/206
See application file for complete search history.

(56) References Cited

U.S. PATENT DOCUMENTS

| | | | |
|---|---|---|---|
| 8,370,143 B1 * | 2/2013 | Coker ................... | G06F 40/274 704/240 |
| 2005/0108384 A1 * | 5/2005 | Lambert ............. | H04L 63/1408 709/224 |
| 2011/0207482 A1 * | 8/2011 | Shamma ............... | H04L 67/535 455/466 |
| 2020/0356629 A1 * | 11/2020 | Tan ........................ | G06F 40/289 |
| 2022/0284884 A1 * | 9/2022 | Tongya ................... | A63F 13/67 |
| 2024/0143643 A1 * | 5/2024 | Tsou .................. | G06Q 10/1095 |

OTHER PUBLICATIONS

K. W. Kongsgård, N. A. Nordbotten, F. Mancini and P. E. Engelstad, "Data loss prevention for cross-domain instant messaging," 2017 IEEE Symposium Series on Computational Intelligence (SSCI), Honolulu, HI, USA, 2017, pp. 1-8, (Year: 2017).*
A. Ranganathan, R. H. Campbell, A. Ravi and A. Mahajan, "ConChat: a context-aware chat program," in IEEE Pervasive Computing, vol. 1, No. 3, pp. 51-57, Jul.-Sep. 2002, (Year: 2002).*

(Continued)

*Primary Examiner* — Taylor A Elfervig

(74) *Attorney, Agent, or Firm* — Gilliam IP PLLC

(57) ABSTRACT

A context-based chat message data loss prevention system ("DLP system") detects sensitive chat messages communicated via Software-as-a-Service ("SaaS") applications. The DLP system receives chat messages via SaaS connectors and buffers the chat messages in sliding windows that correspond to context of chat messages within UIs of the SaaS application. The DLP system then filters messages in the sliding windows and classifies the filtered messages with a language model. The resulting sensitive/non-sensitive classifications by the language model thus incorporate chat context for corresponding SaaS applications.

20 Claims, 5 Drawing Sheets

(56) References Cited

OTHER PUBLICATIONS

W. Wang, J. Li, C. Ai and Y. Li, "Privacy protection on sliding window of data streams," 2007 International Conference on Collaborative Computing: Networking, Applications and Worksharing (CollaborateCom 2007), New York, NY, USA, 2007, pp. 213-221 (Year: 2007).*

Rui Yan and Dongyan Zhao. 2018. Coupled Context Modeling for Deep Chit-Chat: Towards Conversations between Human and Computer. In Proceedings of the 24th ACM SIGKDD International Conference on Knowledge Discovery & Data Mining (KDD '18). Association for Computing Machinery, New York, NY, US, 2574-2583 (Year: 2018).*

* cited by examiner

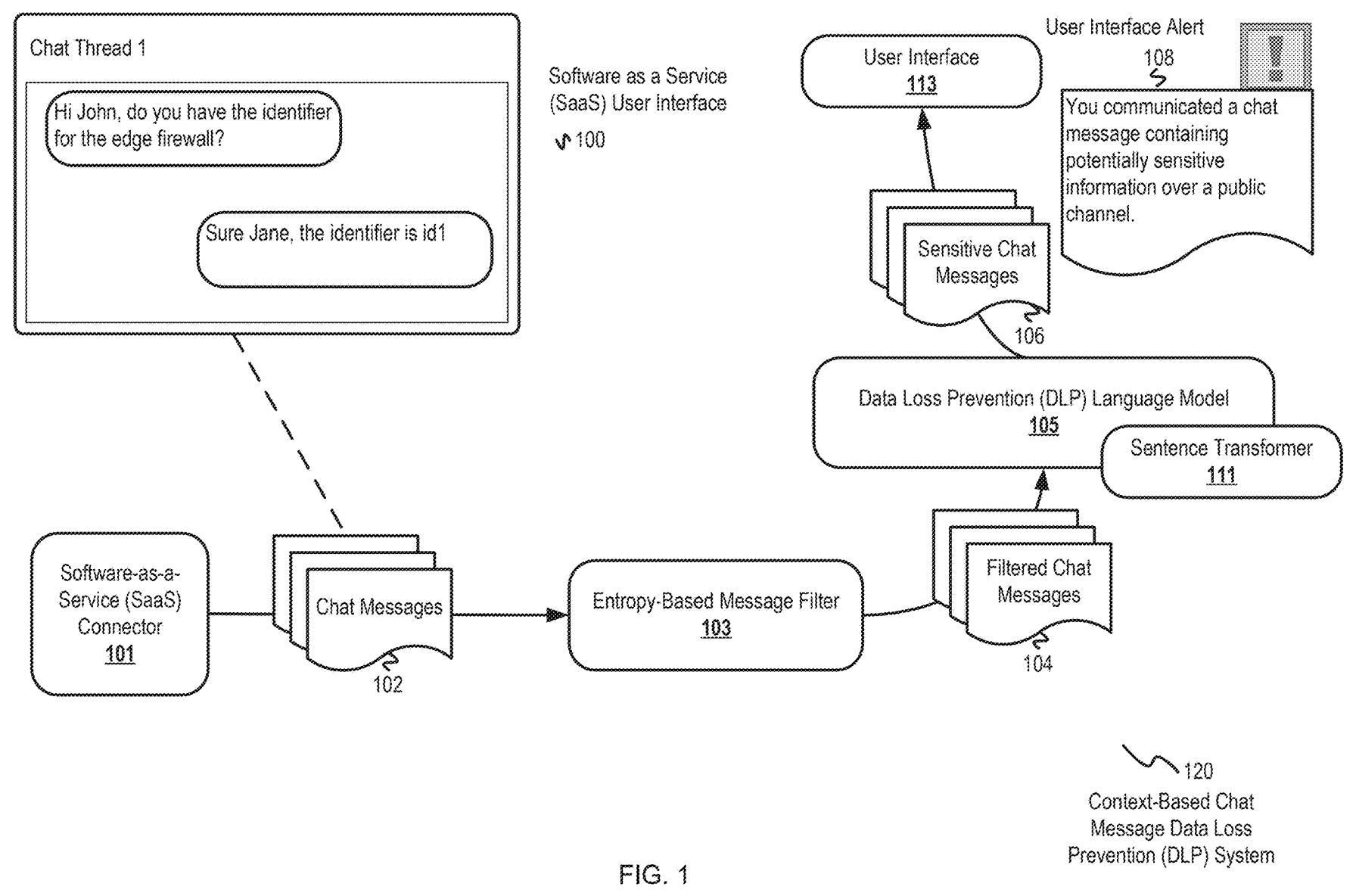

User Interface Alert
108

You communicated a chat message containing potentially sensitive information over a public channel.

Sentence Transformer
111

Data Loss Prevention (DLP) Language Model
105

User Interface
113

Sensitive Chat Messages
106

Filtered Chat Messages
104

Software as a Service (SaaS) User interface
100

Chat Thread 1

Hi John, do you have the identifier for the edge firewall?

Sure Jane, the identifier is id1

Entropy-Based Message Filter
103

Chat Messages
102

Software-as-a-Service (SaaS) Connector
101

Context-Based Chat Message Data Loss Prevention (DLP) System
120

FIG. 1

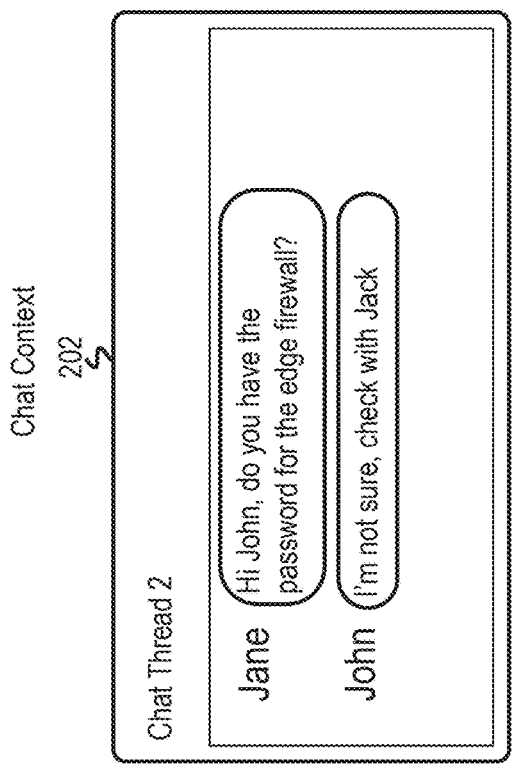
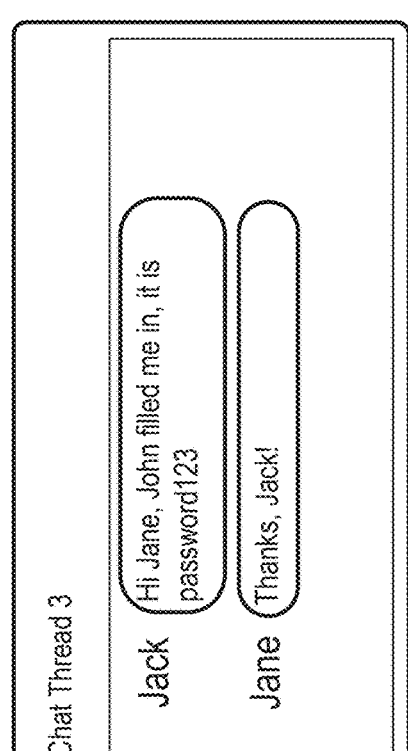
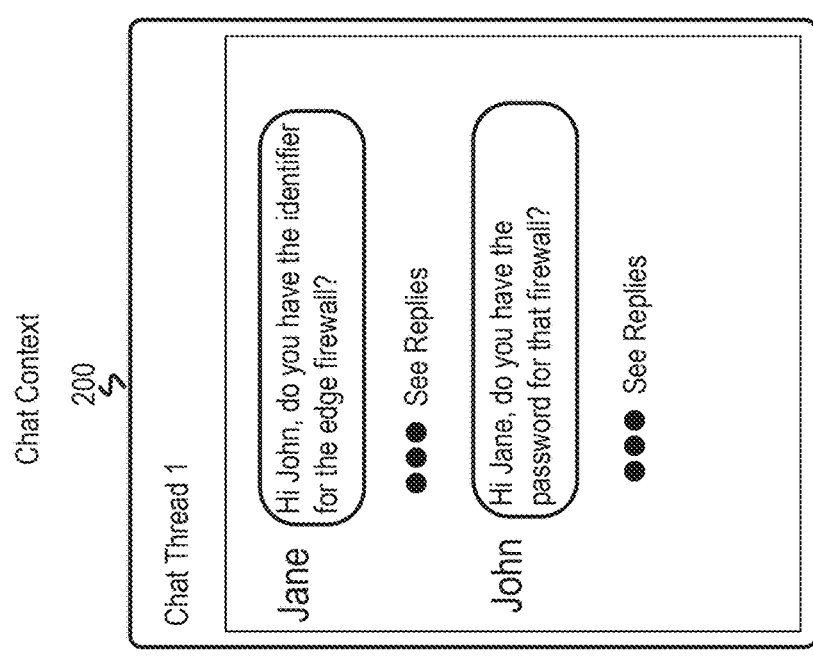
FIG. 2

CONTEXT-BASED SENSITIVE MESSAGE DETECTION

BACKGROUND

The disclosure generally relates to data processing (e.g., CPC class G06F) and to classification (e.g., CPC subclass G06F 16/35).

Data loss prevention (DLP) refers to a system's ability to identify, monitor, and protect data in use, data in motion, and data at rest. Data loss is the loss of control of confidential or sensitive data ("data leakage") and/or the compromise of integrity or availability of data. The different states of data (i.e., data at rest, data in-motion or in-transit, and data at the endpoint) have different vectors of data loss. The ability to monitor and protect data in motion can also be referred to as data leakage prevention. One vector of data loss is directly from users, for instance by accidentally communicating sensitive data over public or vulnerable channels of communication such as chat messages communicated via Software-as-a-Service applications.

BRIEF DESCRIPTION OF THE DRAWINGS

Embodiments of the disclosure may be better understood by referencing the accompanying drawings.

FIG. 1 depicts a schematic diagram of an example context-based chat message DLP system.

FIG. 2 is a diagram of example UIs corresponding to chat context for SaaS applications.

DESCRIPTION

Figure 3:
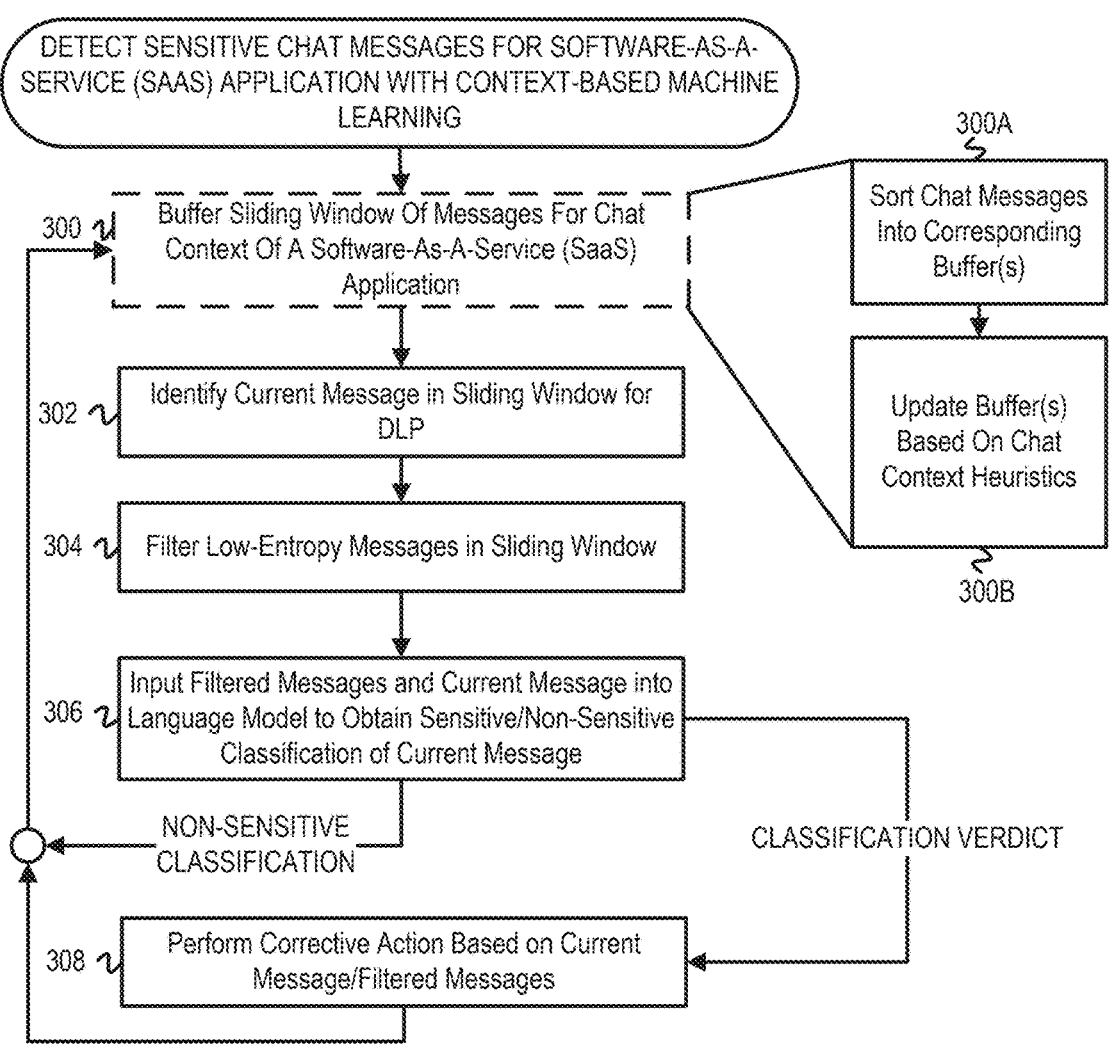
FIG. 3 is a flowchart of example operations for detecting sensitive chat messages for a SaaS application with context-based machine learning.

The description that follows includes example systems, methods, techniques, and program flows to aid in understanding the disclosure and not to limit claim scope. Well-known instruction instances, protocols, structures, and techniques have not been shown in detail for conciseness.

Overview

DLP in the context of chat messages from a Software-as-a-Service (SaaS) application often suffers from a lack of contextual knowledge to inform detection of sensitive data. For instance, a DLP system can mistake random, erroneous, or non-sensitive alphanumeric strings in the chat messages with sensitive passwords, application programming interface (API) keys, message authentication codes (MACs), etc. However, context of the chat messages can aid in determining whether data therein is sensitive or non-sensitive, for instance, when a user explicitly clarifies in previous messages that a subsequent message contains a password. Moreover, the context can often vary by SaaS application—users in different SaaS application contexts are exposed to different data via a user interface, and thus context for the user communicating messages in chat messages varies. A context-based sensitive chat message DLP system ("DLP system") disclosed herein maintains a sliding window of messages in chat messages according to the chat context and determines from the sliding window whether each message comprises sensitive data. The system is augmented by a DLP language model that makes sensitive data classifications from the chat context.

The system comprises one or more SaaS application connectors that function as interfaces between a third-party SaaS application enabling chat functionality for users and the DLP system that detects sensitive data communicated internally and externally across an organization of which the users are part. The one or more SaaS application connectors collect and communicate messages for corresponding SaaS applications to the DLP system in buffers that maintain sliding windows of messages with predefined lengths according to chat contexts for respective SaaS applications. For each sliding window corresponding to a buffer of messages, an entropy-based message filter determines Shannon information of messages in the sliding window and filters messages having low Shannon information (i.e., that are less likely to carry high-value information) from the buffer. The DLP language model receives the buffer comprising the sliding window of messages and classifies each message in the buffer as comprising sensitive or non-sensitive data. The DLP detection engine comprises a sentence transformer that receives, at each message in the buffer, the current message and the messages within the sliding window and outputs a sensitive/non-sensitive data verdict. The DLP system communicates sensitive data verdicts to user interfaces (UIs) of corresponding users of the organization and performs corrective actions thereof. Using conversation context of messages in the chat messages allows for higher accuracy/lower false positive detection of sensitive data with less training data, and the DLP system adapts this conversation context to a format of UI displayed to users that communicated the messages.

Terminology

A "thread" as used herein refers to a sequence of messages within a same conversation across one or more users. A thread can comprise sequences of reply messages to original messages in a channel, a private conversation between one or more users, etc. In some instances, replies to a thread can have a collapse functionality in a UI provided by a corresponding SaaS application.

A "channel" as used herein refers to one or more logically associated threads in a UI by a SaaS application, for instance, logically associated via clickable on-screen elements in the UI. The logical association can be according to a hierarchy that can define sub-channels of the channel themselves comprises additional threads.

Messages that are "proximal" to other messages comprise messages that are in a same thread, a same channel, are visually proximal in a UI, and/or are proximal by functionality of the UI such as clickable on-screen elements.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Illustrations

FIG. 1 depicts a schematic diagram of an example context-based chat message DLP system. A context-based chat message DLP system ("DLP system") 120 comprises a SaaS connector 101 (e.g., the Slack® Connector service) communicating chat messages 102 for a SaaS application to the DLP system 120. The SaaS connector 101 can comprise any built-in microservices, third-party tools, etc. that are configured to log messages in chats across an organization and communicate the chat messages to the DLP system 120 in one or more buffers. The SaaS connector 101 can maintain multiple buffers for multiple sliding windows of messages in the chat messages 102, for instance separate buffers for each message thread, channel, private one-on-one user conversations, etc. In some embodiments, a buffer can span multiple threads or channels. For instance, a buffer can span multiple sub-channels of a channel, multiple threads within a channel, multiple private conversations having shared users, etc. Moreover, each buffer can have a fixed length or variable length of messages in its sliding window. To exemplify, a buffer can comprise a fixed number of threads (e.g., within a channel) and can comprise every message in each of those threads up to the fixed number. The sliding window can comprise both prior and subsequent messages. Buffer design is adapted to format of a UI for the corresponding SaaS application to model context of a user communicating a message. For instance, threads/conversations/channels can be omitted from buffers when they are obfuscated from a user or users corresponding to the buffer in a UI of a particular SaaS application.

Example SaaS UI 100 comprises a chat thread, depicted as "Chat Thread 1," between a user John and a user Jane with the messages "Hi John, do you have the identifier for the edge firewall?" and "Sure Jane, the identifier is id1". In this instance, the identifier of the edge firewall may comprise a generic identifier and not comprise sensitive data. Therefore, a DLP system not using chat context may detect "id1" (which can be a random alphanumeric) and flag this identifier as potentially sensitive, whereas the DLP system 120 may analyze the chat messages in the example SaaS UI 100 and determine, based on the context, that "id1" is an identifier of a firewall and non-sensitive (as is presumed to be the case in this example). Chat context in the example SaaS UI 100 is a private chat conversation between users John and Jane. Additional examples of chat context in SaaS UIs are provided in FIG. 2.

The DLP system 120 further comprises an entropy-based message filter ("filter") 103 that calculates entropy values of messages in each sliding window in the chat messages 102 and filters messages below a threshold entropy value to obtain filtered chat messages 104. The sliding window of messages can be messages stored in data structures corresponding to each buffer. The filter 103 computes Shannon information of the event of each message occurring in the corresponding sliding window being analyzed for DLP and filters messages with Shannon information below a threshold Shannon information. The filter 103 is trained on a corpus (e.g., previously seen messages by the cybersecurity system, publicly available natural language datasets, etc.) to calculate Shannon information of sequences of tokens. For instance, training the filter 103 can comprise maintaining an index of probability values for every token in the corpus occurring in a message based on observed frequency of the token in the corpus, wherein the probability of a message is the product of probabilities of tokens in the message assuming occurrence of each token is an independent event. For a probability p of a message, the Shannon information can then be computed as $H=-\log(p)$. Other methods for calculating Shannon information of messages and other information-theoretic metrics such as perplexity are additionally anticipated.

A DLP language model 105 receives the filtered chat messages 104 from the filter 103 and detects sensitive chat messages 106 comprising sensitive data. The DLP language model 105 comprises a sentence transformer 111 that is pretrained to classify messages as comprising sensitive or non-sensitive data. The sentence transformer 111 can comprise a classification head built on top of an existing transformer that was trained to generate embeddings that represent natural language context. The classification head can be trained on examples of windows of messages labelled a sensitive/non-sensitive by inputting the windows of messages into the sentence transformer 111 (without the classification head). In some embodiments, the embedding part of the sentence transformer 111 architecture can be fine-tuned on contexts of messages for DLP prior to training the classification head. As an example, the sentence transformer 111 can comprise SetFit. Although depicted as a sentence transformer 111, the DLP language model 105 can comprise any language model trained to detect sensitive data in windows of messages while accounting for natural language context.

The DLP language model 105 communicates the sensitive chat messages 106 and their context to a UI 113. The DLP language model 105 can indicate severity of sensitive data in the sensitive chat messages 106, for instance according to context where the messages were detected (e.g., security clearance of users or teams associated with the messages, whether the messages were communicated internally or externally to an organization, etc.). Based on severity, the UI 113 can perform various corrective actions. For instance, for low severity messages, the UI 113 can generate an alert warning a user that communicated the message and additional users associated with the messages (e.g., users in the same channel, users that replied to threads in the channel, etc.) not to communicate sensitive data in an associated SaaS application. For medium severity messages, the UI 113 can delete the messages comprising sensitive data from memory. For high severity messages, the UI 113 can generate an alert to a cybersecurity administrator indicating the potential data leak. The UI 113 can additionally display context of the sensitive messages to the user(s) and/or administrator such as messages in the sliding window of messages for the sensitive message. Example UI alert 108 comprises the text "You communicated a chat message containing potentially sensitive information over a public channel."

The above embodiments refer to collecting chat messages to detect sensitive data in messages with the SaaS connector 101. The SaaS connector 101 can comprise multiple connectors with multiple SaaS applications. Alternatively, the present disclosure can relate to other methods or software modules for data collection, for instance analyzing email threads by accessing local memory that stores content of the email threads. The example pipeline for filtering and classifying messages using sliding windows of messages and natural language processing (NLP) of messages can vary. For instance, messages can be filtered according to other metrics or classifications (e.g., a NLP model can classify messages as high or low importance and low importance messages can be filtered) or not filtered at all. Other NLP embeddings (e.g., word2vec) can be implemented other than sentence transformer embeddings. The filtered chat messages can be preprocessed (e.g., via one-hot encoding) prior to being input to the DLP language model 105.

FIG. 2 is a diagram of example UIs corresponding to chat context for SaaS applications. Chat context 200 comprises a first chat thread ("chat thread 1"). The chat thread 1 comprises a message "Hi John, do you have the identifier for the edge firewall" from user Jane with replies to the message obscured by a clickable element " . . . See Replies." The chat thread 1 also comprises a message "Hi Jane, do you have the password for that firewall?" from user John with replies to the message also obscured by a clickable element " . . . See Replies." The chat context 200 can comprise a channel with access to certain users and can be included in a buffer of chat context for each of the users Jane and John. Alternatively, a buffer can be maintained for the channel itself, and can include the chat context 200 as well as other channels, threads, etc. associated with those users. The chat context 200 can, in some embodiments, also include all replies to each message, and can count each message and its replies as a single message when determining length of a sliding window of messages corresponding to a buffer.

Chat context 202 comprises a second chat thread ("chat thread 2") and a third chat thread ("chat thread 3"). Chat thread 2 comprises a private chat conversation between users Jane and John with a message "Hi John, do you have the password for the edge firewall?" from Jane and the message "I'm not sure, check with Jack" from John. Chat thread 3 comprises a private chat conversation between users Jack and Jane with a message "Hi Jane, John filled me in, it is password123" from Jack and a message "Thanks, Jack!" from Jane. In this instance, the prior conversation between Jane and John gives context that password123 is a password. This context may not be present in a conversation between Jack and John, for instance when they converse offline. Chat context 202 illustrates that chat context can comprise multiple channels/threads having overlapping sets of users, in this case user Jane. As an additional illustrative example, chat context for a channel involving more than two users can also comprise private chat conversations between each pair of users and/or additional channels involving a threshold number of users from the channel (e.g., two users). Proximal messages in chat context can be influenced by logical associations of channels/threads in a UI, for instance in chat context 200 where the clickable element " . . . Replies" logically associates messages with their replies.

Figure 4:
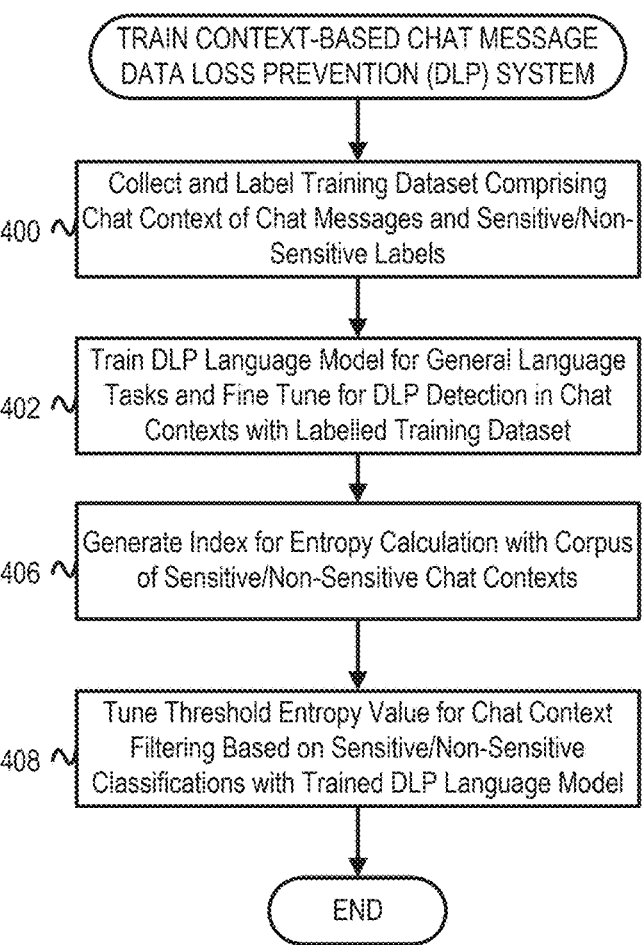
FIG. 4 is a flowchart of example operations for training a context-based chat message DLP system.

FIGS. 3 and 4 are flowcharts of example operations for training and deploying a context-based chat message DLP system ("DLP system") for detecting sensitive chat messages for SaaS applications with chat context. The example operations are described with reference to the DLP system and SaaS connectors for consistency with the earlier figures and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for detecting sensitive chat messages for a SaaS application with context-based machine learning. FIG. 3 describes a buffer of a sliding window of messages for a chat context of a SaaS application. The DLP system can maintain multiple buffers for multiple contexts and multiple SaaS applications. Chat messages can be buffered into multiple buffers based on heuristics for each chat context, for instance a chat context for a user, a chat context for a team of that user, a chat context for an organization or department including that team, etc. In some instances, a chat context can comprise messages across multiple SaaS applications and the buffers can be maintained for chat messages received at multiple SaaS connectors for the multiple SaaS applications.

At block 300, the DLP system buffers a sliding window of messages for chat context of a SaaS application. As the DLP system buffers the sliding window of messages, operational flow proceeds to block 302 when the buffer is updated. Block 300 is depicted with a dashed outline to indicate that buffering of the sliding window of messages according to the chat context is ongoing until an external trigger (e.g., deactivation of the SaaS application, prompting by a cyber-security administrator, etc.) occurs or is detected, which terminates buffering operations and the remaining operations depicted in FIG. 3. Operations at block 300 are subdivided into sub-blocks 300A and 300B. While block 300 is described for a single buffer and a single SaaS application, operations at block 300 as further described at blocks 300A and 300B can occur across multiple buffers for multiple SaaS applications.

At block 300A, the DLP system sorts chat messages received at a SaaS connector(s) into corresponding a buffer(s). Each buffer corresponds to channels/threads associated with a SaaS application, and the chat messages can comprise metadata that indicate corresponding channels/threads and/or the SaaS connector(s) can sort the chat messages by channels/threads.

At block 300B, the DLP system updates the buffer(s) based on chat context heuristics. The chat context heuristics are heuristics for identifying proximal messages in a UI of a corresponding SaaS application, and can be specific to a user, a team of users, a department of an organization, etc. Each buffer has a corresponding heuristic that defines a sliding window of chat messages to include in the buffer. For instance, the heuristic can indicate a sliding window of length n, where n indicates the number of threads (e.g., chat messages and subsequent replies) within a channel to include in the corresponding buffer. The heuristic can additionally or alternatively indicate a number of messages in one or more private conversations to include in the corresponding buffer. Updating the buffer(s) can comprise removing messages/threads from the end of the buffer and adding messages/threads to the beginning of the buffer according to the corresponding heuristic. Each buffer indicates a current message, for instance with a pointer data structure that iterates through current messages as each message is processed for DLP in the subsequent operations. In some embodiments, the pointer can skip messages when only a subset of messages is analyzed for DLP (for instance, to reduce computational load).

At block 302, the DLP system identifies a current message in a sliding window for DLP corresponding to the buffer. The DLP system can identify each time the buffer is updated, each time one or more chat messages are added and/or removed from the buffer, each time the current message in a buffer changes, etc.

At block 304, the DLP system filters out low-entropy messages in the sliding window corresponding to the buffer. The DLP system computes entropy values (e.g., Shannon information) of each message in the sliding window except the identified message and determines the entropy value of each message. The DLP system then filters each message with an entropy value below a threshold entropy value for some metric of entropy, wherein the threshold entropy value can be determined during training to ensure the resulting filtered messages are high-quality. In some embodiments, the DLP system can store entropy values for messages in the buffer and can use the stored values for messages whose entropy values have been computed at previous DLP iterations.

At block 306, the DLP system inputs the filtered messages and current message with a language model to obtain a sensitive/non-sensitive classification of the identified message. For instance, the language model can comprise a sentence transformer pretrained on general language tasks and further trained on sensitive/non-sensitive chat contexts. The DLP system can preprocess the filtered messages and the current message (e.g., with NLP embeddings) prior to inputting to the language model. If the language model classifies the current message as comprising sensitive data, operational flow proceeds to block 308. Otherwise, operational flow returns to block 300.

At block 308, the DLP system performs corrective action based on the current message/filtered messages. The corrective action can depend on context of the current message/filtered messages. For instance, for messages communicated across a private channel via an internal network of an organization, the corrective action can comprise a user alert of potential communication of sensitive data. For more public contexts, such as public channels or channels that interface with an external network, the corrective action can comprise blocking communication streams, alerting network administrators, terminating processes associated with the SaaS application, triaging extent of data leakage, etc. Operational flow returns to block 300.

FIG. 4 is a flowchart of example operations for training a context-based chat message DLP system. At block 400, a DLP system collects and labels a training dataset comprising chat context of chat messages and corresponding sensitive/non-sensitive labels. The DLP system can collect the chat contexts from chat logs of SaaS applications for an organization according to corresponding chat context heuristics for those SaaS applications. The sensitive/non-sensitive labels can be generated by other DLP detection systems and/or manually labelled by domain-level experts. In some embodiments, for instance when an organization wants to preserve data privacy, the training dataset can comprise a public dataset constructed from known sensitive/non-sensitive chat contexts stored in a public repository.

At block 402, the DLP system trains a DLP language model for general language tasks and fine tunes the DLP language model for DLP in chat contexts with a labelled dataset. For instance, the DLP language model can initially be an off-the-shelf language model (e.g., a sentence transformer such as SetFit) that is fine-tuned by adding a classification head. The classification head can receive output from a hidden layer of the off-the-shelf language model (e.g., the penultimate layer) and itself output a sensitive/non-sensitive classification. The classification head can be trained by inputting the training dataset into the ensemble of the off-the-shelf language model and the classification head and backpropagating loss according to the sensitive/non-sensitive labels just through the classification head. Other natural language model types/architectures are anticipated, and, depending on amount of training data, the DLP language model can solely be trained for DLP and not previously trained for general language tasks.

At block 406, the DLP system generates an index for entropy calculation with a corpus of sensitive/non-sensitive chat contexts. The index for entropy calculation comprises an index of frequencies of tokens, phrases, sentences, messages, etc. in the corpus. Calculation of frequencies in the index depends on a metric used of entropy calculation. For instance, for Shannon information the index can comprise frequencies of tokens in the corpus. The index for entropy calculation can be updated as the DLP system receives additional chat contexts for DLP.

At block 408, the DLP system tunes a threshold entropy value for chat context filtering based on sensitive/non-sensitive classifications with the trained DLP language model. The DLP system can apply filtering to the training dataset with a threshold entropy value for an entropy metric, input the filtered training dataset into the trained DLP language model, and evaluate false positives/false negatives in resulting classifications. The threshold entropy value can then be tuned to minimize false positives/false negatives. Alternatively, for instance when the DLP system tunes the threshold entropy value prior to training the DLP language model, a domain-level expert can manually inspect the resulting filtered chat contexts for quality and tune the threshold entropy value accordingly.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, in FIG. 4, when the threshold entropy value tuning does not depend on a trained DLP language model, the operations at blocks 400, 402 can occur subsequent to and/or in parallel with the operations at blocks 406, 408. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 5:
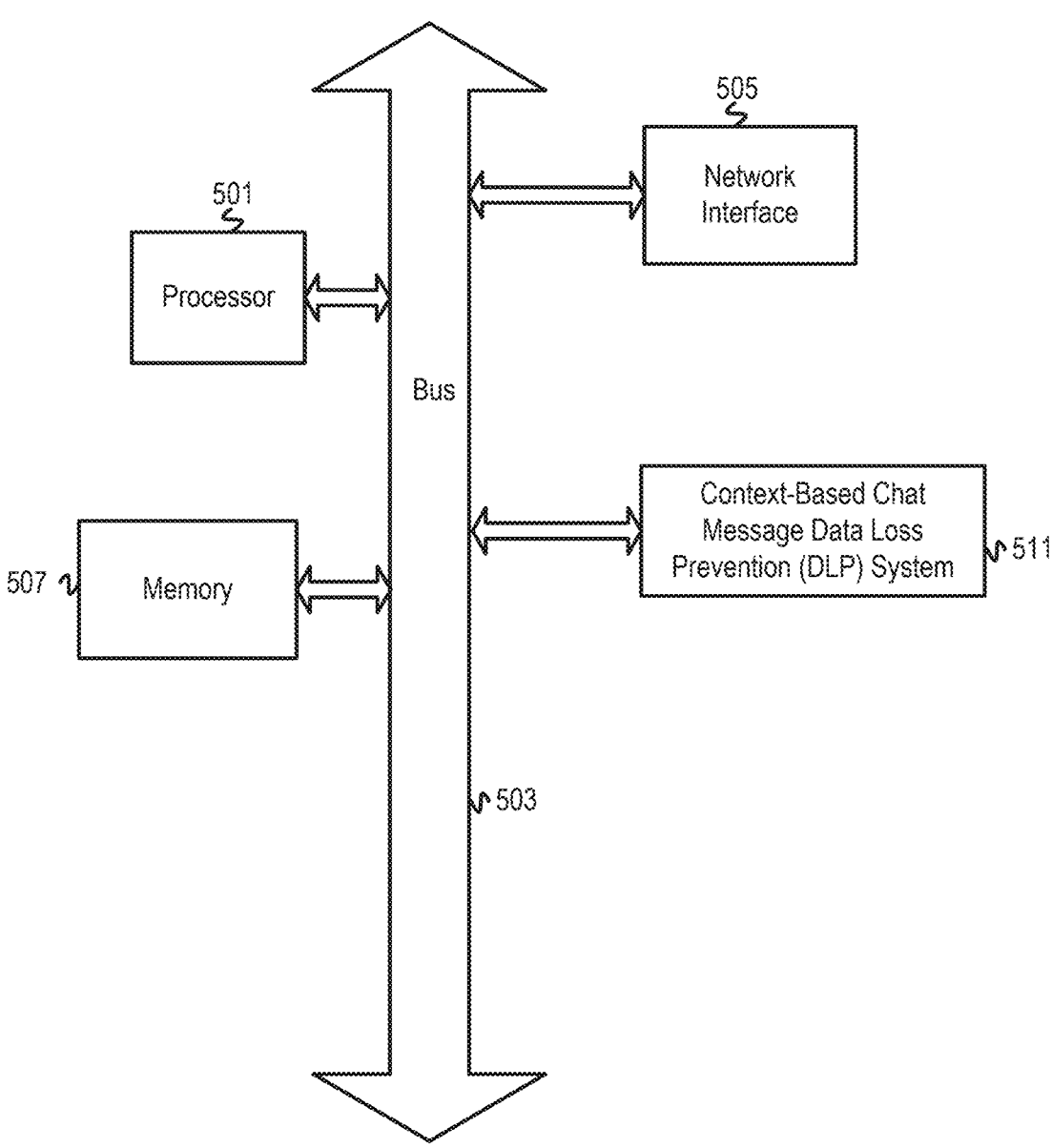
FIG. 5 depicts an example computer system with a context-based chat message DLP system.

FIG. 5 depicts an example computer system with a context-based chat message DLP system. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes a context-based chat message DLP system ("DLP system") 511. The DLP system 511 comprises a SaaS connector(s) for receiving chat logs for chat messages of SaaS applications, an entropy-based message filter ("filter") for filtering context of chat messages based on entropy, and a DLP language model for classifying filtered chat messages as sensitive/non-sensitive. The DLP system 511 receives chat messages from the SaaS connectors and sorts the chat messages into various buffers corresponding to various chat contexts that correspond to proximal chat messages based on UIs of corresponding SaaS applications and users communicating the chat messages. The DLP system 511 maintains a sliding window of chat messages in each buffer based on heuristics for the corresponding buffer and applies the filter to obtain high-entropy messages in the sliding window. The DLP language model then classifies the filtered chat messages as sensitive/non-sensitive and performs corrective action thereof. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

The invention claimed is:

1. A method comprising:
    updating buffers with messages in a sliding window of messages according to context heuristics for the buffers, wherein the context heuristics are heuristics for identifying those chat messages in a sliding window of messages proximal to a first message of the sliding window for different contexts and corresponding to channels and threads with respect to a user interface of a Software-as-a-Service (SaaS) application;
    for each buffer,
        filtering one or more messages from a first plurality of messages in the buffer to obtain a second plurality of messages, wherein filtering the one or more messages from the first plurality of messages is according to entropy of each of the first plurality of messages;
        invoking a language model on the second plurality of messages and the first message to obtain as output a verdict indicating whether the first message comprises sensitive data; and
        based on the verdict indicating the first message comprises sensitive data, performing corrective action to prevent data loss from communication of the first message.

2. The method of claim 1, wherein the language model comprises a sentence transformer.

3. The method of claim 1, further comprising computing an entropy value for each of the first plurality of messages, wherein filtering the one or more of the first plurality of messages comprises filtering those of the first plurality of messages with corresponding entropy values below a threshold entropy value.

4. The method of claim 3, wherein computing the entropy value for each of the first plurality of messages comprises computing the entropy value with an algorithm for Shannon entropy.

5. The method of claim 1, further comprising,
    receiving messages from an interface with the SaaS application; and
    maintaining the sliding window of messages received from the interface with the SaaS application, wherein the first plurality of messages comprises messages within the sliding window around the first message.

6. The method of claim 1, further comprising,
    sorting messages received by the SaaS application by at least one of a channel and a thread associated with the SaaS application,
    wherein updating the buffers comprises analyzing the sorted messages based on the context heuristics to update a first of the buffers with messages across at least two channels and/or threads.

7. The method of claim 6, wherein the context heuristics indicate a number of threads in a channel for a buffer and a number of messages in private conversations for a buffer.

8. A non-transitory machine-readable medium having program code stored thereon, the program code comprising instructions to:
    update a plurality of buffers with chat messages in a sliding window of messages according to context heuristics for the plurality of buffers, wherein the context heuristics are heuristics for identifying those chat messages in the sliding window of messages proximal to a first message of the sliding window for different contexts corresponding to channels and threads with respect to a user interface of a Software-as-a-Service (SaaS) application;
    for each of the plurality of buffers,
        filter one or more messages from a first plurality of messages in the buffer to obtain a second plurality of messages, wherein filtering the one or more messages from the first plurality of messages is accord-
ing to entropy of each of the first plurality of mes-
sages;

invoke a language model on the second plurality of
messages and the first message to obtain as output a
verdict indicating whether the first message com-
prises sensitive data; and based on the verdict indicating the first message com-
prises sensitive data, perform corrective action to
prevent data loss from communication of the first
message.

9. The machine-readable medium of claim 8, wherein the
language model comprises a sentence transformer.

10. The machine-readable medium of claim 8, wherein
the program code further comprises instructions to compute
an entropy value for each of the first plurality of messages,
wherein the instructions to filter the one or more of the first
plurality of messages comprise instructions to filter those of
the first plurality of messages with corresponding entropy
values below a threshold entropy value.

11. The machine-readable medium of claim 10, wherein
the instructions to compute the entropy value for each of the
first plurality of messages comprise instructions to compute
the entropy value with an algorithm for Shannon entropy.

12. The machine-readable medium of claim 8, wherein
the program code further comprises instructions to:

receive messages at an interface with the SaaS applica-
tion; and maintain the sliding window of messages received from
the interface with the SaaS application, wherein the
first plurality of messages comprises messages within
the sliding window around the first message.

13. The non-transitory machine-readable medium of
claim 8, wherein the program code further comprises
instructions to:

sort messages received by the SaaS application by at least
one of a channel and a thread associated with the SaaS
application, wherein the instructions to update the plurality of buffers
comprise instructions to analyze sorted messages based
on the context heuristics to update a first of the plurality
of buffers with messages across at least two channels
and/or threads.

14. The non-transitory machine-readable medium of
claim 13, wherein the context heuristics indicate a number
of threads in a channel for a buffer and a number of messages
in private conversations for a buffer.

15. The non-transitory machine-readable medium of
claim 13, wherein the context heuristics comprise a number
of threads in a channel for a buffer and a number of messages
in private conversations for a buffer.

16. An apparatus comprising:

a processor; and a machine-readable medium having instructions stored
thereon that are executable by the processor to cause
the apparatus to, update a plurality of buffers with chat messages in a
sliding window of messages according to context heu-
ristics for the plurality of buffers, wherein the context
heuristics are heuristics for identifying those chat mes-
sages in the sliding window of messages proximal to a
first message of the sliding window for different con-
texts corresponding to channels and threads with
respect to a user interface of a Software-as-a-Service
(SaaS) application;

for each of the plurality of buffers, filter one or more messages from a first plurality of
messages in the buffer to obtain a second plurality of
messages, wherein filtering the one or more mes-
sages from the first plurality of messages is accord-
ing to entropy of each of the first plurality of mes-
sages;

invoke a language model on the second plurality of
messages and the first message to obtain as output a
verdict indicating whether the first message com-
prises sensitive data; and based on the verdict indicating the first message com-
prises sensitive data, perform corrective action to
prevent data loss from communication of the first
message.

17. The apparatus of claim 16, wherein the language
model comprises a sentence transformer.

18. The apparatus of claim 16, wherein the machine-
readable medium further has stored thereon instructions
executable by the processor to cause the apparatus to com-
pute an entropy value for each of the first plurality of
messages, wherein the instructions to filter the one or more
of the first plurality of messages comprise instructions
executable by the processor to cause the apparatus to filter
those of the first plurality of messages with corresponding
entropy values below a threshold entropy value.

19. The apparatus of claim 16, wherein the machine-
readable medium further has stored thereon instructions
executable by the processor to cause the apparatus to:

receive messages at an interface with the SaaS applica-
tion; and maintain the sliding window of messages received from
the interface with the SaaS application, wherein the
first plurality of messages comprises messages within
the sliding window around the first message.

20. The apparatus of claim 16, wherein the machine-
readable medium further has stored thereon instructions
executable by the processor to cause the apparatus to:

sort messages received by the SaaS application by at least
one of a channel and a thread associated with the SaaS
application; and wherein the instructions to update the plurality of buffers
comprise instructions executable by the processor to
cause the apparatus to analyze the sorted messages
based on the context heuristics to update a first of the
plurality of buffers with messages across at least two
channels and/or threads.

* * * * *